United States Patent [19]

Rose et al.

[11] 4,075,667
[45] Feb. 21, 1978

[54] METHOD AND APPARATUS FOR ALIGNING READ/WRITE HEADS IN A DISC RECORDER

[75] Inventors: Andrew M. Rose, Santa Clara; Brian Paul Tremaine, San Jose, both of Calif.

[73] Assignee: Sperry Rand Corporation, New York, N.Y.

[21] Appl. No.: 641,608

[22] Filed: Dec. 17, 1975

[51] Int. Cl.² ............................................. G11B 21/10
[52] U.S. Cl. ......................................................... 360/77
[58] Field of Search ........................... 360/77, 109, 137

[56] References Cited

U.S. PATENT DOCUMENTS

| | | | |
|---|---|---|---|
| 3,593,331 | 7/1971 | Connell | 360/77 |
| 3,947,881 | 3/1976 | Dahill et al. | 360/77 |
| 3,994,016 | 11/1976 | Moghadam | 360/77 |

OTHER PUBLICATIONS

Paton, Correction of Data Track Misregistration in Servo Controlled Disc Files, IBM Tech. Disc. Bull, vol. 17, No. 6, 11/74, p. 1781.

*Primary Examiner*—Robert S. Tupper
*Attorney, Agent, or Firm*—Gerald L. Moore

[57] ABSTRACT

In a magnetic disc recorder utilizing a servo head to generate a feedback signal for the positioning of the heads on the recording disc, a method for aligning the read/write heads with the servo heads by eliminating substantially all of the effects of head movement occurring during the head alignment procedure.

3 Claims, 3 Drawing Figures

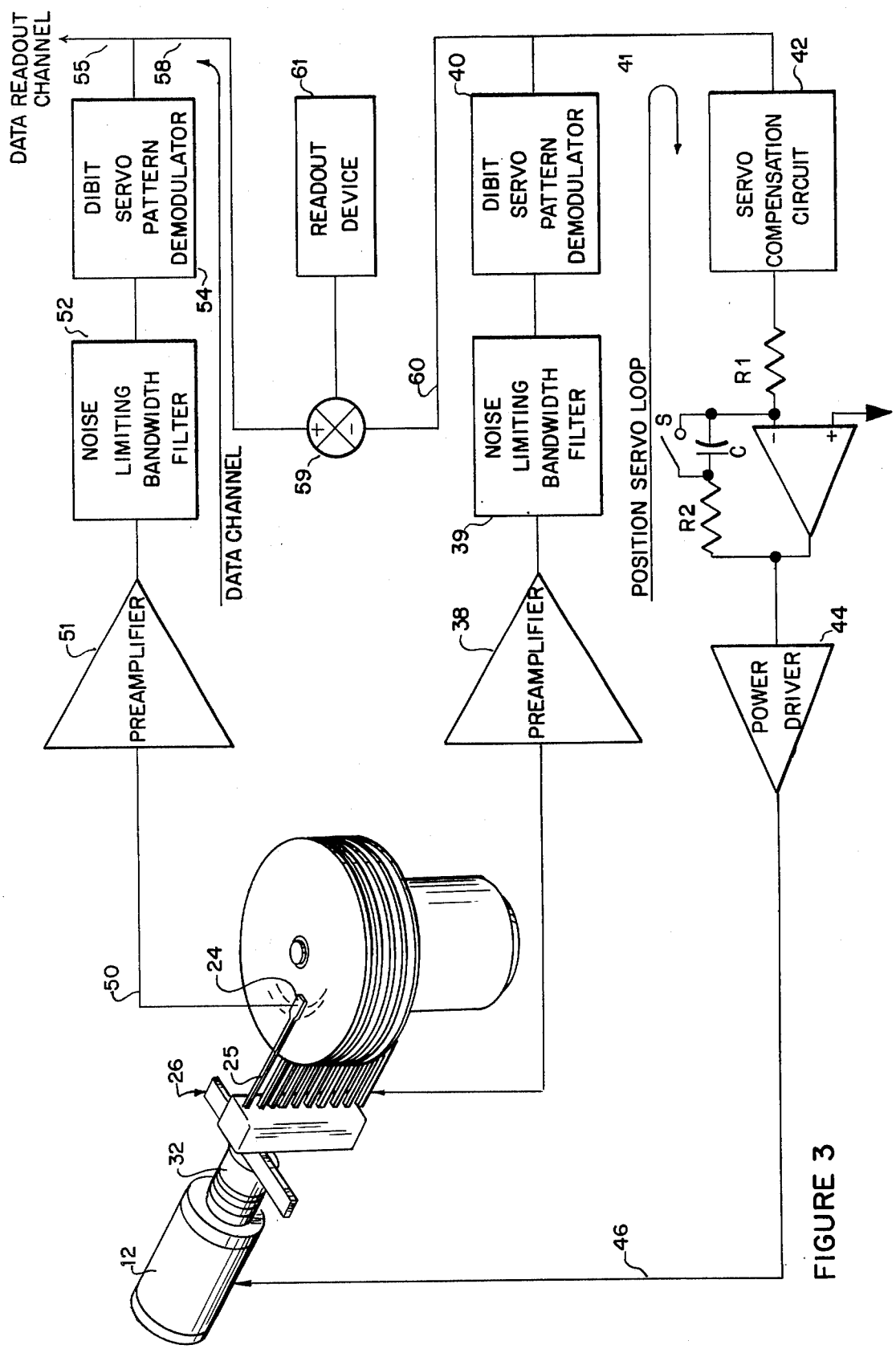

4,075,667

METHOD AND APPARATUS FOR ALIGNING READ/WRITE HEADS IN A DISC RECORDER

BACKGROUND OF THE INVENTION

In present day recording devices and particularly in disc drives there is employed a plurality of recording discs on which data can be recorded in binary form. These discs are usually referred to as a disc pack and are stacked one above the other to be addressed by a plurality of heads in vertical alignment and positioned by a single actuator.

In one embodiment of disc drives used today, one head and one disc surface are dedicated to the generation of a position signal for the servo system. Usually a plurality of servo tracks are recorded in concentric circles on the servo disc surface and the servo head generates a signal responsive to the relative position of the head and each servo track. Thus if the servo head is aligned over a desired track and the other heads are aligned with the servo head, they also will be aligned over a corresponding track on the respective cooperating disc surfaces.

For interchangeability of the disc packs, the various tracks recorded on each of the disc surfaces must be closely aligned with the prerecorded servo track so that the readback of the data from each disc pack is possible on recorders other than the one in which the data was recorded. Thus the normal procedure for assuring that the heads are in alignment vertically is to place on the drive a disc pack having prerecorded and precisely positioned servo tracks on all of the disc surfaces. Such prerecorded disc packs are referred to as CE or Customer Engineer Packs and are commercially available with disc drives for use in aligning the heads. Thereafter the actuator is energized to position the servo head at a desired track. By reading the signals from the individual heads and feeding such signals to a readout means, usually a visual type such as a signal strength meter, it can be detected whether or not that particular head is in close alignment with the data track corresponding to the track the servo head is positioned over. Thereafter provision is made for adjusting the position of each head/arm assembly relative to the carriage and therefore relative to the servo head. By making the necessary adjustment on each head to maximize the signal, the heads are brought into alignment with the servo head.

However problems have developed which make the alignment procedure just described either very difficult to perform or make the results less than satisfactory. For instance, the presence of the technician around and in contact with the disc drive results in vibrations being transmitted throughout the mechanism thereby making the servo signal hard to read. In addition the various normal vibrations in the building in which the drive is located are sensed by both the servo head and the read/write heads causing the position signal to be modulated by all types of other signals and even more difficult to read. Also there are other forces being exerted on the positioning system such as the force of the electrical leads running to the head and the pressure of the technician's tools while making the necessary adjustments, which forces tend to move the servo system off track sufficiently such that alignment of the head to that position will not align the head directly over the track once the force is removed since the servo system head has been moved off track slightly during the adjustment by the force. Thus after such adjustment the servo head will return to a center position and in doing so will move the read/write heads somewhat off track.

It is thus the object of this invention to provide an improved method and apparatus for aligning the read/write heads relative to the servo system in a disc drive assembly.

SUMMARY OF THE INVENTION

A method of aligning the read/write heads and the servo head in a disc drive wherein the servo system detects predetermined positions and in which the heads are aligned therewith by use of a prerecorded servo pack having closely aligned tracks prerecorded for each head, comprising the steps of moving the carriage assembly to position the servo system at a desired track, detecting the signal read by a first read/write head being adjusted and subtracting from that signal another signal detected by a second read/write head to generate a differential signal having the extraneous signal modulations deleted, and utilizing that differential signal while adjusting the position of the first read/write head for maximum signal output from the read/write head and a minimum differential signal. In addition, means are provided for stiffening the response of the servo positioner so as to resist the normal forces tending to move the heads off of the track during the adjustment of the head position relative to the servo system.

DESCRIPTION OF THE DRAWINGS

FIG. 3 shows a partial disc drive apparatus in perspective view with the circuit in block diagram for aligning the read/write heads with the servo system in accordance with the present invention.

DESCRIPTION OF THE INVENTION

Figure 1:
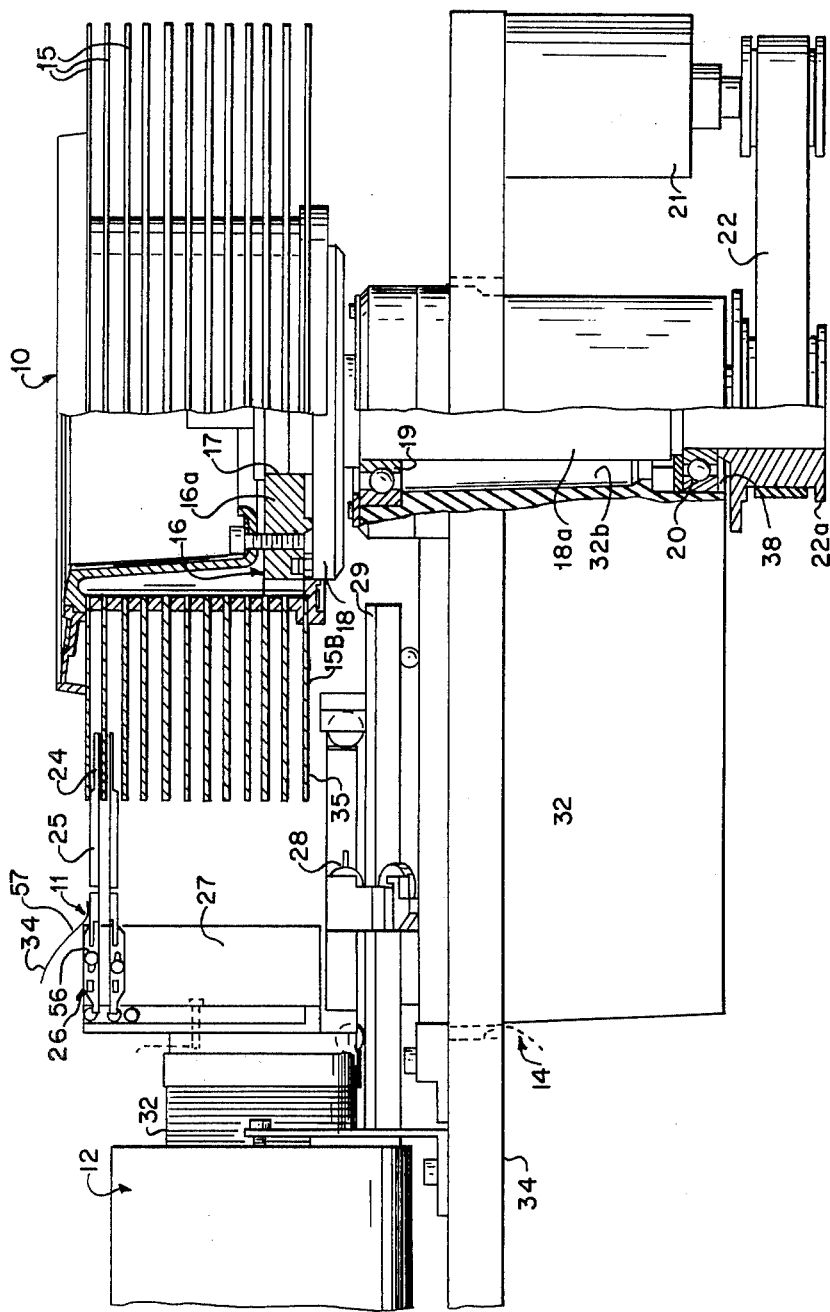
FIG. 1 is a side plan view partially in cross-section of a typical disc drive apparatus.

In the drawings are shown some of the major components of a disc drive to which the invention is particularly applicable. The drive is utilized to read and record data on a disc pack 10 and includes a read/write head assembly 11 and a linear motor 12 mounted on a baseplate assembly 14 for the purpose of reading and writing information in digital form on the individual surfaces of the discs 15. The disc pack 10 serves as a memory device and comprises a plurality of discs having a magnetic coating on the upper and lower surfaces (not shown) on which data in digital form can be recorded magnetically. The discs are mounted in a support 16 having an opening 17 in a lower plate 16A into which a spindle shaft 18 extends. The spindle shaft, lower plate and disc pack include abutting machined surfaces such that when mounted on the shaft the disc pack is precisely positioned relative to the baseplate assembly 14. The spindle shaft is supported by bearings 19 and 20 fixed to the baseplate so as to permit rotation of the spindle shaft and the associated disc pack. A motor 21 drives the spindle shaft and the disc pack through a drive means including a drive belt 22 and a pulley 22a on the spindle shaft.

For reading and writing information on the disc pack surfaces, a read/write head 24 is supported on an arm 25 in close proximity to an associated disc magnetic surface. The arms are mounted on a support assembly 26 comprising a T/block 27 fixed to a carriage having a plurality of rollers 28 for movement along a rail 29 fixed to the baseplate. Linear movement of the support assembly shifts the heads in a direction radially of the disc surfaces. By proper energization of the read/write heads, information in digital form can be transferred to and from the disc surfaces as the disc pack is rotated past the head. Thus data is recorded and read back from tracks in concentric circular locations on the disc surfaces. For a more complete explanation of such an apparatus, reference can be made to the U.S. Pat. No. 3,587,075 entitled Carriage Mechanism For Direct Access Data Storage Device, Brown et al. as inventors and issued on June 22, 1971, and U.S. Pat. No. 3,768,083 entitled Baseplate Assembly For A Disc Drive, Ivan Pejcha as inventor and issued on Oct. 23, 1973.

To effect movement of the support assembly 26 along the rail 29, the electromagnetic linear motor 12 includes an outer pole piece 30 fixed in a stationary position for magnetic interaction with a movable coil 32 attached to the T/block 27 of the support assembly 26. With proper energization of the coil by passage of electric current therethrough, a magnetic interaction between the coil and stationary pole piece 30 will cause the support assembly to move along the extending rail 29 in a direction lateral to the axis of rotation of the disc pack 10. Thus by moving the support assembly in a direction towards and away from the axis of rotation of the disc pack, the heads are positioned adjacent the concentric data tracks on the disc surface. In this manner the head 24 is moved across the disc surface and positioned over the desired data track for the transfer of information in digital form between the head and the disc surface. Electrical signals carrying this information are transmitted through the electrical leads 34 for transmittal to computers and other apparatus (not shown) utilizing the information.

As an illustration of one means for detecting the position of the heads, there is provided a servo system including one servo head 35 positioned adjacent the bottom disc 15B (FIG. 1). This head is dedicated to the detection of the position of the carriage and heads and normally is not utilized to write information. Prerecorded tracks on the surface of the disc 15B are provided for indicating the various track locations at which data can be recorded on the other disc surfaces. Thus with movement of the head 35 and the carriage, the signal from the surface of the disc 15B is detected and fed into a servo system for determining the location of the servo head 35. By detecting the location of this servo head, the location of all of the read/write heads stacked vertically relative thereto is also indicated.

The servo signal is transmitted through the conductor 37 to a preamplifier 38 and on to a noise-limiting band-width filter 39 and a dibit servo-pattern demodulator 40. From there the signal in modified form is transmitted through the conductor 41 to a servo compensation circuit 42 similar to that disclosed in U.S. Pat. No. 3,808,486 entitled Selective Frequency Compensation For A Servo System, Cuda et al., issued on Apr. 30, 1974. To complete the position servo loop the circuit includes a power driver 44 such as that disclosed in U.S. Pat. No. 3,582,750 entitled Power Driver For Regulating A Servo Motor, Martin Halfhill, Inventor, and issued on June 1, 1971.

Thus the position servo loop is utilized to develop a signal for comparison with a signal indicative of the desired position of the head and received at the terminal 45 for generation of a position error signal to energize the actuator through the conductor 46 and locate the head at the desired track. With the head at the desired track, data can be read by use of one of the heads such as the read/write head 24, which data is transferred through the conductor 50 to a preamplifier 51, a noise-limiting band-width filter 52 and a dibit pattern demodulator 54 for supplying a signal to the conductor 55 leading to a data readout channel. These circuit components are of standard design and commonly used in such data channels. Thus data can be read from the desired track or data can be recorded on a desired track with the track location being sensed by the position servo loop.

The disc packs 10 are removable and replaceable with other disc packs. Thus it is necessary to closely control the position of all of the read/write heads relative to the associated servo head or servo system such that data recorded on one disc pack can be detected and read back on any disc drive or vice-versa. Obviously if the heads are misaligned relative to the servo system positions or tracks, the data can be read back on the same disc drive but other disc drives not having the heads in a similar misalignment cannot read back the data. Thus in the embodiment shown it is necessary to closely align the read/write heads with the servo head in a single vertical plane.

Figure 2:
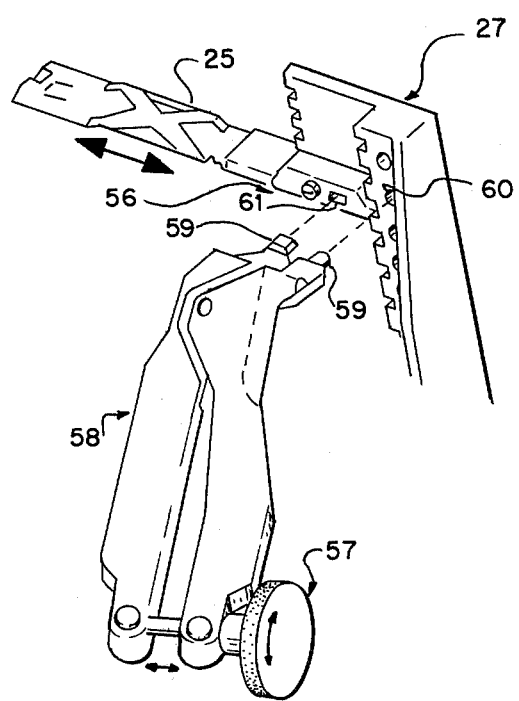
FIG. 2 shows in enlarged detail one method of mechanically adjusting the head/arm positioning.

For alignment of the heads, there is utilized a special recording medium or prerecorded disc pack having data tracks prerecorded on each of the disc surfaces and closely aligned in a vertical plane. Such a pack utilized in aligning the read/write heads is commonly referred to as a CE pack or a Customer Engineer Pack. The packs are made available to customers by disc drive manufacturers for head alignment purposes. For instance one such pack is sold by the Sperry Rand Corporation, Part Number 9023567-00. Such a disc pack is placed on the drive and the signal from each read/write head is detected individually. Thereafter as shown in FIG. 2, a screw 56 is loosened on each arm assembly, and a head alignment tool 58 is inserted with the studs 59 fitting into cooperating openings 60 and 61 in the T/block and arm respectively. The radial position of that head/arm assembly thus can be shifted in the horizontal plane by rotation of the screw 57 on the head alignment tool thereby causing the studs 59 to move clear or further apart to shift the arm until a maximum signal is detected. However experience has shown that the pressure on the screw 57 tends to hold the carriage assembly and associated heads off center from the recorded track. In addition the force of the conductors 34 (FIG. 1) is sufficient also to bias the carriage laterally a short distance away from the track. Further, the cooling air supplied to the disc pack tends to bias the heads away from the center position over the track. All of these conditions tend to shift the position of the carriage such that the servo head is not positioned directly over the servo track even though the servo system indicates this position, therefore adjustment of the position of the read/write head to a maximum signal position will result in some misalignment between the adjusted head and the servo head. With the recording densities being increased with each generation of magnetic disc recorders, such misalignment can become more critical as the recorded data tracks become narrower and closer together.

In addition, since the adjustment of the head is usually accomplished by a visual observation of the signal detected by the read/write head being adjusted, problems of vibration in the disc drive can complicate the proper reading of that signal. For instance, the adjusting tool held by the technician will tend to cause the head to shake or vibrate due to the natural movement of the hand. In addition, any contact with the drive or any vibration transmitted through the floor will tend to modulate the signal detected by the head by causing movement of the head relative to the disc surface. It therefore becomes very difficult to detect just when the signal indicates the head is centered over the data track. In accordance with the present invention, a method is provided for substantially reducing the preceding problems for permitting a more correct alignment of the servo head with the read/write heads.

In accordance with one feature of the invention, the signal generated within the servo system is subtracted from the signal generated in each read/write head circuit and the resultant differential signal is observed and used for adjusting the position of the read/write head. Such is accomplished by the transmission of the read/write head signal through the conductor 58 to a junction 59 which receives also through the conductor 60 the servo head signal. The juncture subtracts the servo signal from the data signal and the resultant signal is fed to a suitable readout device 61 which in most instances is a signal strength meter of suitable design and commonly used in the industry. In the alternative, one read/write head signal can be subtracted from that of another read/write head to eliminate the common modulations of the signals.

By subtracting the signals, most of the extraneous modulations of the signal due to carriage movement are removed. For instance, the signal modulations due to vibrations being transmitted to the drive through the floor on which it is setting, vibrations transmitted to the carriage by the tools used to adjust the head/arm position, and vibrations within the drive due to the operation of the drive motor for the disc pack, the cooling air, et cetera, are substantially eliminated making the signal much easire to observe. Thus a less modulated signal is fed to the readout device and the readout device indicates in a more precise and readable manner the signal actually generated by the read/write head responsive to the track prerecorded on the special disc used for such adjustments. Since the position of the head is only adjusted to generate the minimum relative signal the subtraction of the servo signal from the read/write head signal has little or no other effect on the operation other than eliminating the common modulating signals therefrom.

In accordance with another feature of the invention the servo system is greatly stiffened — that is, adjustment is made to the system such that a much greater force is necessary for moving the head, arm and carriage assembly off-track by an external force than is normally encountered during standard operation of the disc drive. By this adjustment of the operation of the servo system, the forces previously described, and specifically the force of the tools exerted during adjustment of the head/arm position, are rendered insufficient for moving the head/arm assembly and carriage off track.

For this purpose, there is provided in the position servo loop a switch S which when opened, connects a lag-lead compensator circuit in the position servo loop circuit. When the switch S is closed, the compensator capacitor is shorted out and has no effect on the operation of the servo circuit. The use of such a circuit tends to substantially leave the higher frequency signals unaffected because the capicator in effect becomes a short at higher frequencies thereby tending to react to the higher frequency signals as a switch acts when closed. Lower frequency signals result in charging or discharging the capacitor, thereby changing the command signal to the actuator. Thus a low frequency signal, such as results from an offset from track center, causes the capacitor to charge and thereby command the actuator in such a manner as to drive the low frquency signal towards zero, when the low frequency signal reaches zero, the capacitor will neither charge nor discharge and therefore the charge on the capacitor continues to command the actuator. In this manner the capacitor develops the charge that is required to exactly cancel the low frequency disturbance.

The invention claimed is:

1. In a recording device for recording data on a medium and having a plurality of read/write heads and a servo head mounted for simultaneous movement on a carriage effected by energization of an actuator acting responsive to a servo signal detected by the servo head, and wherein the read/write heads are mounted in a manner to allow fine position adjustment relative to the servo head;

the method of aligning the read/write heads relative to the servo head comprising the steps of:

placing on the recording device a medium having prerecorded aligned signals positioned to be detected by the read/write heads and servo head simultaneously to indicate track positions;

detecting the signals read by the servo head and the read/write heads;

subtracting the signals of one read/write head from the signal of the servo head to generate a differential signal; and manually fine adjusting the position of said one read/write head to minimize said differential signal.

2. In the method of aligning the read/write heads as defined in claim 1 including providing means for supplying only the low frequency servo signals to the actuator to thereby make said actuator more resistant to movement resulting from external forces acting on said carriage; and energizing said means to make the actuator more resistant to movement when the position of said one read/write head is being adjusted.

3. In the method as defined in claim 2, said means to make said actuator more resistant to movement comprising a circuit for receiving and storing the servo signal when said servo signal is in the lower frequency ranges and for supplying said lower frequency signals to control energization of said actuator when the position of said one read/write head is being adjusted.

* * * * *